US008945758B2

(12) United States Patent
Kim

(10) Patent No.: US 8,945,758 B2
(45) Date of Patent: Feb. 3, 2015

(54) SECONDARY BATTERY HAVING CAP PLATE ASSEMBLY WITH SHORT CIRCUIT SAFETY MEMBER

(75) Inventor: Dukjung Kim, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 453 days.

(21) Appl. No.: 13/221,775

(22) Filed: Aug. 30, 2011

(65) Prior Publication Data

US 2012/0251852 A1    Oct. 4, 2012

(30) Foreign Application Priority Data

Apr. 4, 2011  (KR) .................. 10-2011-0030631

(51) Int. Cl.
*H01M 2/00*    (2006.01)
*H01M 2/34*    (2006.01)
*H01M 10/44*   (2006.01)

(52) U.S. Cl.
CPC ............ *H01M 2/345* (2013.01); *H01M 10/445* (2013.01); *H01M 2200/20* (2013.01)
USPC .............. 429/163; 429/175; 429/178; 429/61

(58) Field of Classification Search
USPC ................................................. 429/61
See application file for complete search history.

(56) References Cited

U.S. PATENT DOCUMENTS

| 7,232,625 | B2 | 6/2007 | Leysieffer et al. |
| 7,713,651 | B2 | 5/2010 | Leysieffer et al. |
| 8,580,426 | B2 * | 11/2013 | Kim ........................... 429/163 |
| 2010/0086835 | A1 | 4/2010 | Kim |
| 2010/0167107 | A1 | 7/2010 | Byun et al. |
| 2010/0279156 | A1 | 11/2010 | Kim et al. |
| 2010/0291421 | A1 | 11/2010 | Byun et al. |
| 2011/0039136 | A1 * | 2/2011 | Byun et al. ..................... 429/56 |
| 2011/0052949 | A1 | 3/2011 | Byun et al. |
| 2012/0251851 | A1 | 10/2012 | Kim et al. |
| 2013/0071704 | A1 | 3/2013 | Byun et al. |

FOREIGN PATENT DOCUMENTS

| CN | 101997133 A | 3/2011 |
| CN | 102738522 A | 10/2012 |
| DE | 1 032 802 B | 6/1958 |
| EP | 1 073 132 A1 | 1/2001 |
| EP | 1 076 350 A2 | 2/2001 |

(Continued)

OTHER PUBLICATIONS

European Search Report dated Jul. 20, 2012, for corresponding European Patent application 11186447.6, (6 pages).

(Continued)

*Primary Examiner* — Patrick Ryan
*Assistant Examiner* — Lucas J O'Donnell
(74) *Attorney, Agent, or Firm* — Christie, Parker & Hale, LLP

(57) ABSTRACT

A secondary battery includes an electrode assembly; a collecting plate electrically coupled to the electrode assembly and having a short circuit hole; a short circuit member comprising a metal can, wherein the metal can is in the short circuit hole; a case accommodating the electrode assembly and the collecting plate and having an opening; and a cap assembly comprising a cap plate sealing the opening of the case.

19 Claims, 8 Drawing Sheets

(56) References Cited

FOREIGN PATENT DOCUMENTS

| | | |
|---|---|---|
| EP | 2 284 932 A1 | 2/2011 |
| EP | 2 357 685 A1 | 8/2011 |
| JP | 08-124554 | 5/1996 |
| JP | 08-293293 | 11/1996 |
| JP | 09-106804 | 4/1997 |
| JP | 11-204094 A | 7/1999 |
| JP | 2010-267615 | 11/2010 |
| JP | 2011-018645 | 1/2011 |
| JP | 2011-054561 | 3/2011 |
| KR | 10-2006-0039955 | 5/2006 |
| KR | 10-2010-0038054 A | 4/2010 |
| KR | 2010-0076699 A | 7/2010 |
| KR | 10-2011-0087566 | 8/2011 |

OTHER PUBLICATIONS

Patent Abstracts of Japan, and English machine translation of Japanese Publication 08-124554 dated May 17, 1996, (8 pages).

SIPO Office action dated Jan. 6, 2014, for corresponding Chinese Patent application 201110314490.9, (15 pages).

Patent Abstracts of Japan, and English machine translation of Japanese Publication 09-106804 dated Apr. 22, 1997, (16 pages).

* cited by examiner

SECONDARY BATTERY HAVING CAP PLATE ASSEMBLY WITH SHORT CIRCUIT SAFETY MEMBER

CROSS-REFERENCE TO RELATED APPLICATION

This application claims priority to and the benefit of Korean Patent Application No. 10-2011-0030631, filed on Apr. 4, 2011, the entire content of which is incorporated herein by reference.

BACKGROUND

1. Field

Embodiments of the present invention relate to a secondary battery.

2. Description of the Related Art

Unlike primary batteries, which cannot be recharged, secondary batteries can be repeatedly charged and discharged. A low capacity secondary battery that uses a single battery cell packaged in a battery pack is used as a power source for various portable small-sized electronic devices such as cellular phones, and camcorders. A high capacity secondary battery that uses tens of battery cells connected to each other in a battery pack is widely used as a power source for driving motors such as in electric scooters, or hybrid electric vehicles (HEV).

Secondary batteries may be classified into different types, for example, cylindrical and prismatic types. A unit battery includes an electrode assembly having positive and negative electrodes and a separator located between the positive and negative electrodes, a case for receiving the electrode assembly with an electrolyte, and a cap assembly having an electrode terminal installed in the case.

Occasionally, the secondary battery may undergo fire or explosion due to an increase in the internal pressure when excessive heat is generated due to overcharge or an electrolyte is decomposed. Accordingly, there is a need for a secondary battery capable of improved safety.

SUMMARY

Embodiments of the present invention provide a secondary battery which can minimize the manufacturing cost, can reduce the number of manufacturing process steps, and can improve safety while minimizing the overall weight and volume of the battery, which can prevent short circuit due to external moisture induced into a short circuit member, which can efficiently use an internal space of the battery, which can improve assembling efficiency of a cap assembly, and which can prevent a short circuit member from being melted when a short circuit is induced.

According to an embodiment of the present invention, a secondary battery is provided, including an electrode assembly, a collecting plate electrically connected to the electrode assembly and having a short circuit hole, a short circuit member having a metal can installed in the short circuit hole, a case accommodating the electrode assembly and the collecting plate and having an opening, and a cap assembly having a cap plate sealing the opening of the case, wherein the metal can faces the cap plate.

The metal can may be spaced apart from the cap plate.

The metal can and the cap plate may be made of a conductive material and may have different polarities.

The metal can may contact the cap plate when an internal pressure of the secondary battery exceeds a predetermined pressure level.

The short circuit member may further include a sealing gasket formed between the cap plate and the metal can and including an opening formed at a location corresponding to the metal can and a protruding part formed in an upper inside portion of the opening, and a holder disposed at an edge portion of the short circuit hole formed in the bottom surface of the collecting plate.

The metal can may be shaped of a hollow container and may have a lateral surface, a lower surface connected to the lateral surface, a cavity formed by the lateral surface and the lower surface, a convex portion formed at an upper end of the lateral surface, and a recess portion formed at a lower outer side of the lateral surface.

The convex portion may outwardly protrude from the metal can and an end of the convex portion may closely contact the protruding part of the sealing gasket.

The holder may have an opening located at a region corresponding to the short circuit hole and may be inserted into the recess portion.

The metal can may be shaped of a hollow container and may have a lateral surface, a lower surface connected to the lateral surface, a cavity formed by the lateral surface and the lower surface, a concave portion formed at an upper end of the lateral surface, and a recess portion formed at a lower outer side of the lateral surface.

The concave portion may inwardly protrude from the metal can and an end of the concave portion may closely contact the protruding part of the sealing gasket.

The metal can may further include an upper surface formed on the convex portion and facing the lower surface, and the end of the convex portion closely contacts the protruding part of the sealing gasket.

The sealing gasket may be made of an insulating material.

The holder may be made of a plastic material.

The metal can may be made of phosphor bronze or beryllium copper.

The collecting plate may include a connecting portion installed between an upper portion of the electrode assembly and a lower portion of the cap assembly and having the short circuit hole positioned therein, and an extending portion bent and extending from an end of the connecting portion and electrically connected to the electrode assembly.

The collecting plate may further include a fuse hole formed at a region of the connecting portion adjacent to the extending portion.

The cap plate may further include a short circuit groove formed at a region facing the metal can.

The secondary battery may further include a lower insulation member positioned between the collecting plate and the cap plate and covering the collecting plate, wherein the lower insulation member includes an exposing hole formed at a location corresponding to the metal can.

According to another embodiment of the present invention, a secondary battery is provided, including an electrode assembly, a collecting plate electrically connected to the electrode assembly, a case accommodating the electrode assembly and the collecting plate and having an opening, a cap assembly having a cap plate sealing the opening of the case, and a short circuit member having a metal can installed in the collecting plate between the case and the cap assembly and facing the cap plate.

As described above, in the secondary battery according to the embodiment of the present invention, since a short circuit member including a metal can, a sealing gasket and a holder is installed in the secondary battery, the manufacturing cost and the number of manufacturing process steps are reduced and the safety can be improved while minimizing the overall weight and volume of the battery.

In addition, the secondary battery according to the embodiment of the present invention can prevent short circuit from occurring due to external moisture induced into a short circuit member.

Further, the secondary battery according to the embodiment of the present invention can efficiently utilize an internal space of the battery by installing the short circuit member in the secondary battery.

Additionally, the secondary battery according to the embodiment of the present invention can improve assembling efficiency of a cap assembly by means of the short circuit member.

In addition, the secondary battery according to the embodiment of the present invention can prevent the short circuit member from being melted when short circuit is induced.

BRIEF DESCRIPTION OF THE DRAWINGS

The objects, features and advantages of the present invention will be more apparent from the following detailed description in conjunction with the accompanying drawings, in which:

FIG. 3 is an enlarged cross-sectional view illustrating an 'A' portion shown in

FIG. 2;

DETAILED DESCRIPTION

Hereinafter, embodiments of the present invention will be described in detail with reference to the accompanying drawings.

Figure 1:
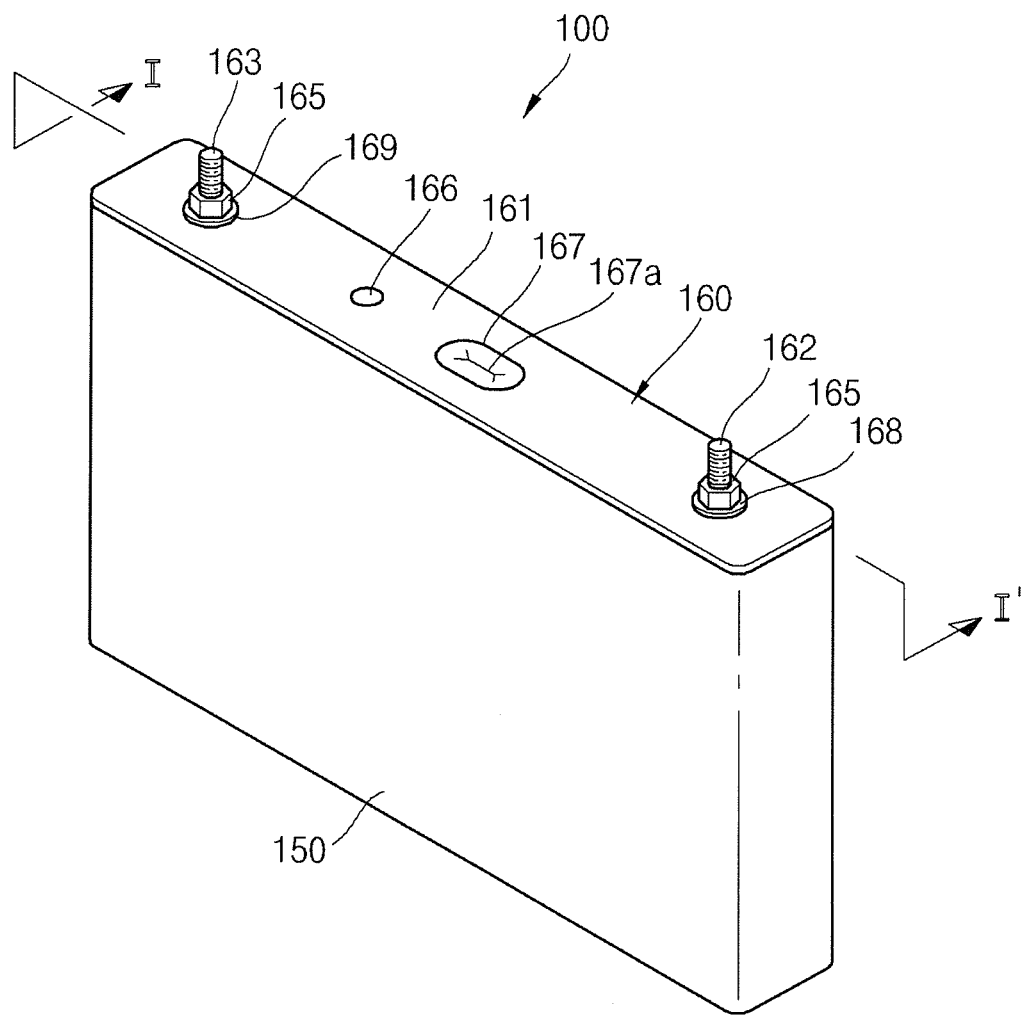
FIG. 1 is a perspective view of a secondary battery according to an embodiment of the present invention.
Figure 2:
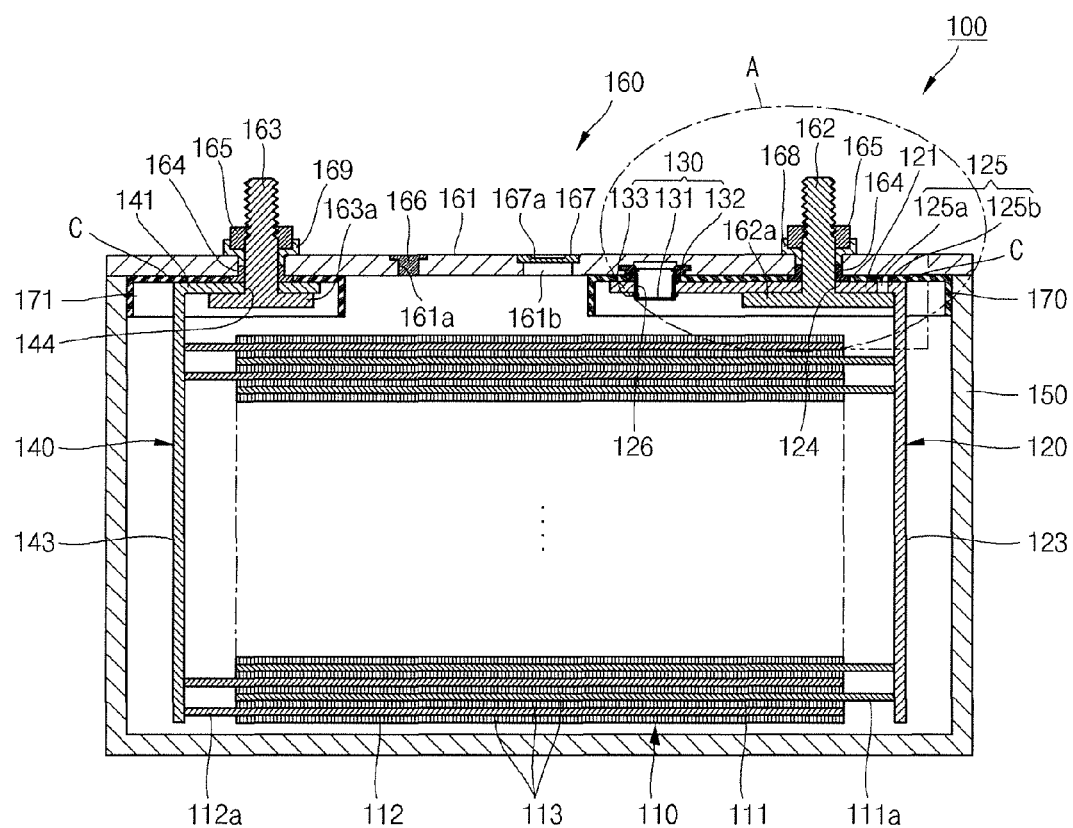
FIG. 2 is a cross-sectional view of the secondary battery taken along the line I-I' of FIG. 1.
Figure 3:
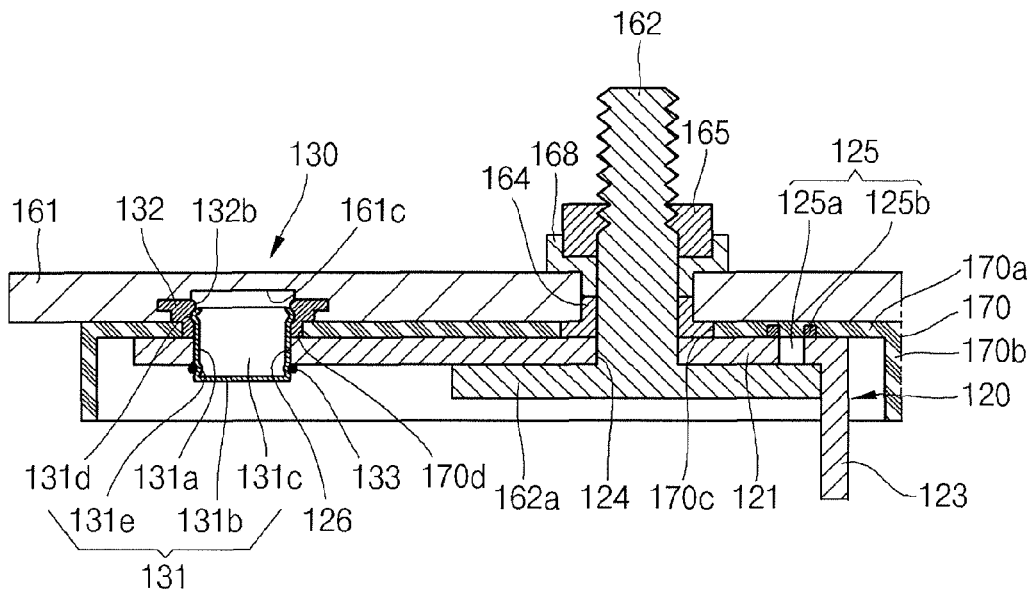
Figure 4:
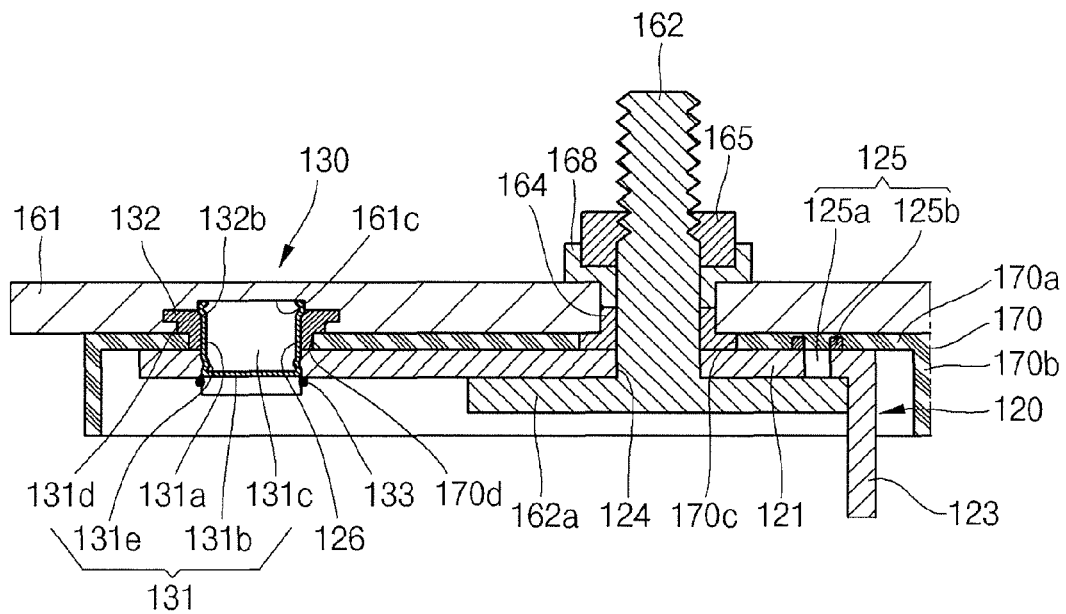
FIG. 4 is a cross-sectional view illustrating an operation in which a metal can of FIG. 3 contacts a cap plate.
Figure 5:
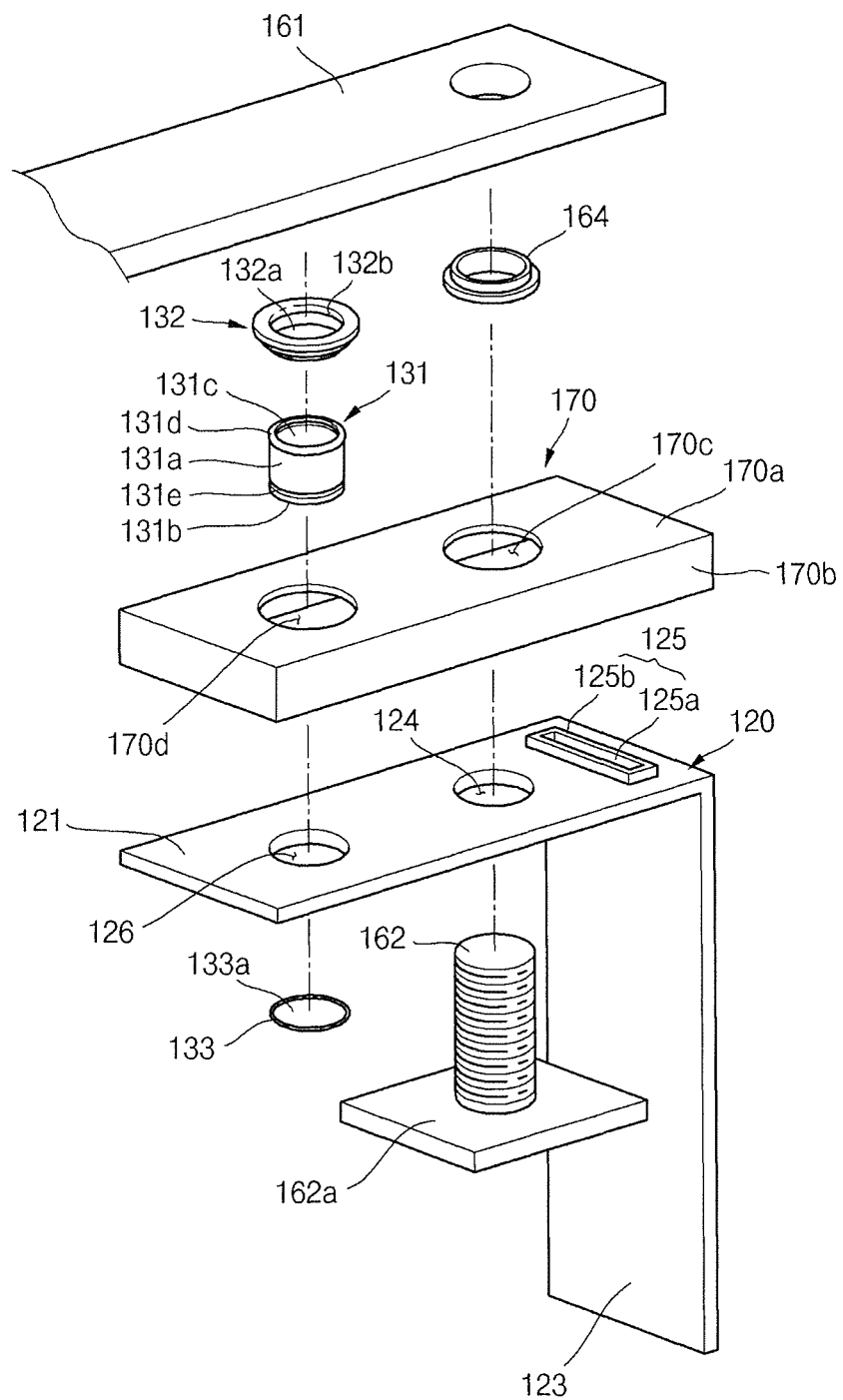
FIG. 5 is an exploded perspective view partially illustrating a structure shown in FIG. 3.

FIG. 1 is a perspective view of a secondary battery according to an embodiment of the present invention, FIG. 2 is a cross-sectional view of the secondary battery taken along the line I-I' of FIG. 1, FIG. 3 is an enlarged cross-sectional view illustrating an 'A' portion shown in FIG. 2, FIG. 4 is a cross-sectional view illustrating an operation in which a metal can of FIG. 3 contacts a cap plate, and FIG. 5 is an exploded perspective view partially illustrating a structure shown in FIG. 3.

Referring to FIGS. 1 through 5, the secondary battery 100 includes an electrode assembly 110, a first collecting plate 120, a short circuit member 130, a second collecting plate 140, a case 150, and a cap assembly 160.

The electrode assembly 110 is formed by winding or stacking a first electrode plate 111, a separator 113 and a second electrode plate 112, which are formed of a thin plate or layer. Here, the first electrode plate 111 may operate as a negative electrode and the second electrode plate 112 may operate as a positive electrode, or vice versa.

The first electrode plate 111 is formed by coating a first electrode active material such as graphite or carbon on a first electrode collector formed of a metal foil made of copper or nickel and includes a first electrode uncoated region 111a that is a region not coated with a first electrode active material. The first electrode uncoated region 111a acts as a path of the flow of current between the first electrode plate 111 and the outside thereof. However, the material of the first electrode plate 111 is not limited to those listed herein.

The second electrode plate 112 is formed by coating a second electrode active material such as a transition metal oxide on a second electrode collector formed of a metal foil made of aluminum and includes a second electrode uncoated region 112a that is a region not coated with a second electrode active material. The second electrode uncoated region 112a acts as a path of the flow of current between the second electrode plate 112 and the outside thereof. However, the material of the second electrode plate 112 is not limited to those listed herein.

The first and second electrode plates 111 and 112 may have different polarities.

The separator 113 may be located between the first electrode plate 111 and the second electrode plate 112 for preventing a short circuit therebetween and allowing for movement of lithium ions. In addition, the separator 113 may be formed of polyethylene (PE), polypropylene (PP), or a composite film of PE and PP. However, the material of the separator 113 is not limited thereto.

The electrode assembly 110 is accommodated in the case 150 with electrolyte. The electrolyte may include an organic solvent such as ethylene carbonate (EC), propylene carbonate (PC), diethyl carbonate (DEC), ethyl methyl carbonate (EMC) or dimethyl carbonate (DMC), and a lithium salt such as $LiPF_6$ or $LiBF_4$. In addition, the electrolyte can be a liquid, solid, and/or gel electrolyte.

The first collecting plate 120 and the second collecting plate 140 are electrically connected to the first electrode plate 111 and the second electrode plate 112, respectively, at opposing ends of the electrode assembly 110.

The first collecting plate 120 may be made of a conductive material such as copper or a copper alloy, and contacts the first electrode uncoated region 111a protruding to one end of the electrode assembly 110 to be electrically connected to the first electrode plate 111. Referring to FIG. 2, the first collecting plate 120 may include a first connecting portion 121, a first extending portion 123, a first terminal hole 124, a first fuse portion 125 and a first short circuit hole 126.

The first connecting portion 121 is installed between an upper portion of the electrode assembly 110 and a lower portion of the cap assembly 160 and is formed in the shape of a plate. The first connecting portion 121 provides for a space for coupling a metal can 131 to the first electrode terminal 162.

The first extending portion 123 is bent and extends from an end of the first connecting portion 121 and is shaped of a plate substantially contacting the first electrode uncoated region 111a. Here, a corner where the first connecting portion 121 and the first extending portion 123 meet is denoted as 'C' and the first connecting portion 121 and the first extending portion 123 are perpendicular to each other with respect to the corner C.

The first terminal hole 124 is formed at one side of the first connecting portion 121 and provides for a space in which the first electrode terminal 162 of the cap assembly 160 is inserted. Here, the first terminal hole 124 is positioned in the first connecting portion 121 to be distal from the corner C.

The first fuse portion 125 is formed on an upper portion of the electrode assembly 110, that is, on the first connecting portion 121, so as to avoid contact with an electrolyte. In addition, the first fuse portion 125 is positioned at a region adjacent to the corner C of the first connecting portion 121 so as not to overlap with the first electrode terminal 162 coupled to the first terminal hole 124. Specifically, the first fuse portion 125 includes a first fuse hole 125a, and a first reinforcing protrusion 125b protruding around the first fuse hole 125a. The first fuse hole 125a functions as a fuse that shuts down the flow of current by melting a portion where the first fuse hole 125a is formed by the heat generated when a large amount of current flows in the secondary battery 100 due to short circuit. The first reinforcing protrusion 125b reinforces the portion proximate the first fuse hole 125a to protect against a short circuit occurring in the secondary battery 100.

The first short circuit hole 126 is formed such that the metal can 131 is inserted into the other side of the first connecting portion 121.

The short circuit member 130 is formed in a space between the cap assembly 160 and the electrode assembly 110, specifically a space between a lower portion of the cap assembly 160 and an upper portion of the electrode assembly 110 and allows the first fuse portion 125 to shut down the flow of current by inducing short circuit when the internal pressure of the secondary battery 100 exceeds a predetermined pressure level due to overcharge. The short circuit member 130 includes a metal can 131, a sealing gasket 132, and a holder 133.

The metal can 131 is installed in the first short circuit hole 126 of the first collecting plate 120 and is spaced from and faces the cap plate 161 of the cap assembly 160. The first metal can 131 is a hollow container having a top opening and is made of a conductive material. As shown in FIG. 3, the metal can 131 has a lateral surface 131a, a lower surface 131b connected to the lateral surface 131a, a cavity 131c formed by the lateral surface 131a and the lower surface 131b, a convex portion 131d formed at an upper end of the lateral surface 131a, and a recess portion 131e formed at a lower outer side of the lateral surface 131a. The first metal can 131 is electrically connected to the first collecting plate 120. As shown in FIG. 4, when the internal pressure of the secondary battery 100 exceeds a predetermined pressure level, the metal can 131 upwardly moves to contact the cap plate 161 to cause short circuit to the secondary battery 100. If the short circuit is induced, a large amount of current flows and heat is generated in the secondary battery 100. In this case, the first fuse portion 125 functions as a fuse, thereby improving the safety of the secondary battery 100. Here, the convex portion 131d outwardly protrudes from the metal can 131 and increases a coupling efficiency with respect to the sealing gasket 132, thereby increasing the sealing efficiency of a space between the cap plate 161 and the metal can 131 by means of the sealing gasket 132. In addition, since the convex portion 131d is curved, it may facilitate pushing of a protruding part 132b of the sealing gasket 132 to allow the metal can 131 to upwardly move when the internal pressure of the secondary battery 100 exceeds a predetermined pressure level. The recess portion 131e provides for a space for inserting the holder 133, thereby allowing the holder 133 to stably hold the metal can 131. The metal can 131 may be made of, for example, phosphor bronze or beryllium copper, but is not limited thereto.

The sealing gasket 132 is made of an insulating material and is located between the cap plate 161 and the metal can 131. The sealing gasket 132 prevents a short circuit between the metal can 131 and the cap plate 161. In addition, the sealing gasket 132 seals a gap between the cap plate 161 and the metal can 131, and allows the metal can 131 to upwardly move due to a pressure difference between a region between an inside portion of the metal can 131 and a lower portion of the cap plate 161 and another region between an outside portion of the metal can 131 and an inside portion of the case 150 when the internal pressure of the secondary battery 100 exceeds a predetermined pressure level. The sealing gasket 132 includes an opening 132a formed at a location corresponding to the metal can 131. When the internal pressure of the secondary battery 100 exceeds a predetermined pressure level, the opening 132a provides for a path that allows the metal can 131 to contact the cap plate 161 to induce short circuit. In addition, the sealing gasket 132 includes a protruding part 132b formed at an upper inner side of the opening 132a, the protruding part 132b closely contacting an end of the convex portion 131d of the metal can 131. The sealing gasket 132 increases the efficiency of sealing the gap between the cap plate 161 and the metal can 131 using the protruding part 132b. Here, the sealing gasket 132 may be coupled to the bottom surface of the cap plate 161 by an interference fit.

The holder 133 is located at an edge portion of the first short circuit hole 126 in the bottom surface of the first connecting portion 121 and is inserted into the recess portion 131e of the metal can 131. The holder 133 may be formed as an O-ring having an opening 133a located at a region corresponding to the first short circuit hole 126, but the invention does not limit the shape of the holder 133 thereto. The holder 133 fixes the metal can 131 and prevents the metal can 131 from upwardly moving due to an external force, such as minute vibration, when the internal pressure of the secondary battery 100 is less than a predetermined pressure level. On the other hand, when the internal pressure of the secondary battery 100 exceeds the predetermined pressure level, the metal can 131 upwardly moves to push the holder 133. In one embodiment, the can may be made of a flexible material, for example, a plastic resin material.

The second collecting plate 140 may be made of a conductive material such as aluminum or an aluminum alloy and contacts the second electrode uncoated region 112a protruding to the other end of the electrode assembly 110 to be electrically connected to the second electrode plate 112. The second collecting plate 140 includes a second connecting portion 141, a second extending portion 143 and a second terminal hole 144.

The second connecting portion 141 is installed between an upper portion of the electrode assembly 110 and a lower portion of the cap assembly 160 and is formed in the shape of a plate.

The second extending portion 143 is a plate that is bent and extends from an end of the second connecting portion 141 such that it contacts the second electrode uncoated region 112a. Here, a corner where the second connecting portion 141 and the second extending portion 143 meet is also denoted as 'C' and the second connecting portion 141 and the second extending portion 143 are substantially perpendicular to each other with respect to the corner C.

The second terminal hole 144 is formed at one side of the second connecting portion 141 and provides for a space in which a second electrode terminal 163 of the cap assembly 160 is inserted and coupled. Here, the second terminal hole 144 is spaced from the corner C of the second connecting portion 141.

The case 150 is made of a conductive metal such as aluminum, an aluminum alloy or nickel plated steel. The case 150 is formed in a rectangular box shape and has an opening through which the electrode assembly 110, the first collecting plate 120 and the second collecting plate 140 can be inserted and placed. While the opening is not illustrated in FIG. 2 because the case 150 and the cap assembly 160 are in an assembled state, the peripheral portion of the cap assembly 160 substantially corresponds to the opening of the case 150. In one embodiment, the interior surface of the case 150 is insulated so that the case 150 is electrically insulated from the electrode assembly 110, the first collecting plate 120, the second collecting plate 140 and the cap assembly 160. Here, the case 150 may serve as an electrode, for example, a positive electrode.

The cap assembly 160 is coupled to the case 150. Specifically, the cap assembly 160 includes a cap plate 161, a first electrode terminal 162, a second electrode terminal 163, a gasket 164, and a nut 165. In addition, the cap assembly 160 may further include a plug 166, a vent plate 167, a first upper insulation member 168, a connection member 169, a first lower insulation member 170 and a second lower insulation member 171.

The cap plate 161 seals an opening of the case 150 and may be made of the same material as the case 150. Accordingly, the cap plate 161 and the case 150 may have the same polarity. The cap plate 161 may include an electrolyte injection hole 161a, a vent hole 161b and a short circuit groove 161c. Here, the short circuit groove 161c provides for a space in which the metal can 131 upwardly moves to contact the cap plate 161 when the internal pressure of the secondary battery 100 exceeds a predetermined pressure level.

The first electrode terminal 162 passes through one side of the cap plate 161 to be electrically connected to the first collecting plate 120. The first electrode terminal 162 may be a pillar. A thread is formed at an outer circumference of an upper pillar portion exposed to an upper portion of the cap plate 161. A lower pillar portion of the cap plate 161 positioned at a lower portion of the cap plate 161 is inserted into the first terminal hole 124 of the first collecting plate 120, and includes a flange 162a for preventing the first electrode terminal 162 from being dislodged from the cap plate 161. Here, the first electrode terminal 162 is insulated from the cap plate 161.

The second electrode terminal 163 passes through the other side of the cap plate 161 to be electrically connected to the second collecting plate 140. The second electrode terminal 163 includes a flange 163a, and has substantially the same configuration as the first electrode terminal 162. Thus, a repeated explanation will be omitted. Here, the second electrode terminal 163 is electrically connected to the cap plate 161.

The gasket 164 is formed between the first electrode terminal 162 and the cap plate 161 and between the second electrode terminal 163 and the cap plate 161 using an insulating material to seal spaces therebetween. The gasket 164 prevents external moisture from permeating into the secondary battery 100 or prevents the electrolyte accommodated in the secondary battery 100 from being effused outside.

The nut 165 is engaged with a thread formed in each of the first electrode terminal 162 and the second electrode terminal 163, thereby fixing the first electrode terminal 162 and the second electrode terminal 163 to the cap plate 161, respectively.

The plug 166 seals the electrolyte injection hole 161a of the cap plate 161. The vent plate 167 is installed in the vent hole 161b of the cap plate 161 and includes a notch 167a formed to be opened at a predetermined pressure.

The first upper insulation member 168 is positioned between the first electrode terminal 162 and the cap plate 161, and the first electrode terminal 162 is fitted into the first upper insulation member 168. The first upper insulation member 168 closely contacts the cap plate 161 and the gasket 164. The first upper insulation member 168 insulates the first electrode terminal 162 from the cap plate 161.

The connection member 169 is positioned between the second electrode terminal 163 and the cap plate 161, and the second electrode terminal 163 is fitted into the connection member 169. In addition, the connection member 169 closely contacts the cap plate 161 and the gasket 164 through the nut 165. The connection member 169 electrically connects the second electrode terminal 163 and the cap plate 161 to each other.

The first lower insulation member 170 is positioned between the first collecting plate 120 and the cap plate 161 and covers the first connecting portion 121 of the first collecting plate 120. The first lower insulation member 170 is made of an insulating material to prevent an unnecessary short circuit between the first collecting plate 120 and the cap plate 161. The first lower insulation member 170 has an upper surface 170a contacting a bottom surface of the cap plate 161 and lateral surfaces 170b extending from edges of the upper surface 170a toward the electrode assembly 110. Here, the first lower insulation member 170 includes a terminal passing throughhole 170c formed at a location corresponding to the first electrode terminal 162 so as to allow the first electrode terminal 162 to pass therethrough, and an exposing hole 170d formed at a location corresponding to the metal can 131 so as to provide for a path in which the metal can 131 upwardly moves when the internal pressure of the secondary battery 100 exceeds a predetermined pressure level. Alternatively, although not shown, the first lower insulation member 170 may be configured to be capable of holding the metal can 131 of the short circuit member 130. In this case, the holder 133 of the short circuit member 130 may not be provided.

The second lower insulation member 171 is positioned between the second collecting plate 140 and the cap plate 161 and covers the second connecting portion 141 of the second collecting plate 140. The second lower insulation member 171 is made of an insulating material to prevent an unnecessary short circuit between the second collecting plate 140 and the cap plate 161.

As described above, since the short circuit member 130 including the metal can 131, the sealing gasket 132 and the holder 133 is provided in the secondary battery 100 according to the embodiment of the present invention, compared to the conventional secondary battery in which a short circuit member is installed outside a cap assembly, the number of components required can be reduced while preventing the flow of current in an event where a short circuit occurs to the conventional secondary battery due to overcharge, etc. Accordingly, the secondary battery 100 according to the embodiment of the present invention can reduce the manufacturing cost and the number of manufacturing process steps and can improve the safety while reducing the overall weight and volume of the battery.

In addition, the secondary battery 100 according to the embodiment of the present invention can prevent short circuit from occurring due to external moisture induced into a short circuit member 130, unlike the conventional secondary battery in which a short circuit member is installed outside a cap assembly.

Further, the secondary battery 100 according to the embodiment of the present invention can efficiently utilize an internal space of the battery 100 by locating the short circuit member 130 within the secondary battery 100, unlike the conventional secondary battery in which a short circuit member is installed outside a cap assembly.

Additionally, the secondary battery 100 according to the embodiment of the present invention can improve assembling efficiency of a cap assembly 160 by means of the short circuit member 130, unlike the conventional secondary battery in which a short circuit member is installed outside a cap assembly.

In addition, the secondary battery 100 according to the embodiment of the present invention can prevent the short circuit member 130 from being melted when short circuit is induced into the secondary battery 100, unlike the conventional secondary battery having a short circuit member formed of a thin plate.

Figure 6:
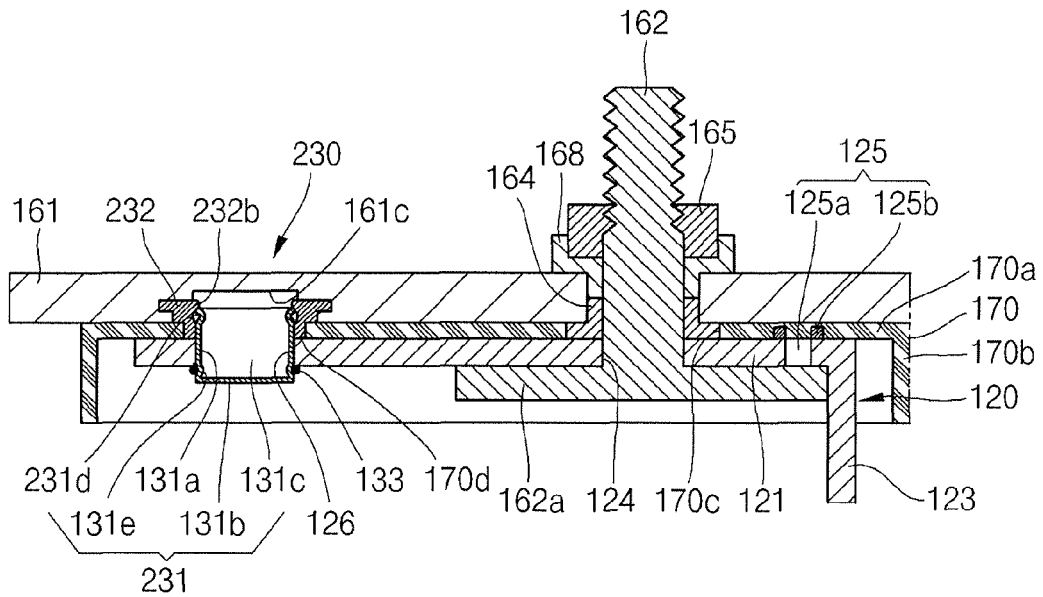
FIG. 6 is a cross-sectional view illustrating a portion corresponding to FIG. 3 in a secondary battery according to another embodiment of the present invention.

Next, a secondary battery according to another embodiment of the present invention will be described. FIG. 6 is a cross-sectional view illustrating a portion corresponding to FIG. 3 in a secondary battery according to another embodiment of the present invention, FIG. 7 is a cross-sectional view illustrating an operation in which a metal can of FIG. 6 contacts a cap plate, and FIG. 8 is an exploded perspective view partially illustrating a structure shown in FIG. 6.

The secondary battery according to the embodiment of the present invention is substantially the same as the secondary battery 100 shown in FIG. 2, except for a short circuit member 230. Thus, repeated explanations will be omitted and the following description will focus on the short circuit member 230.

Figure 7:
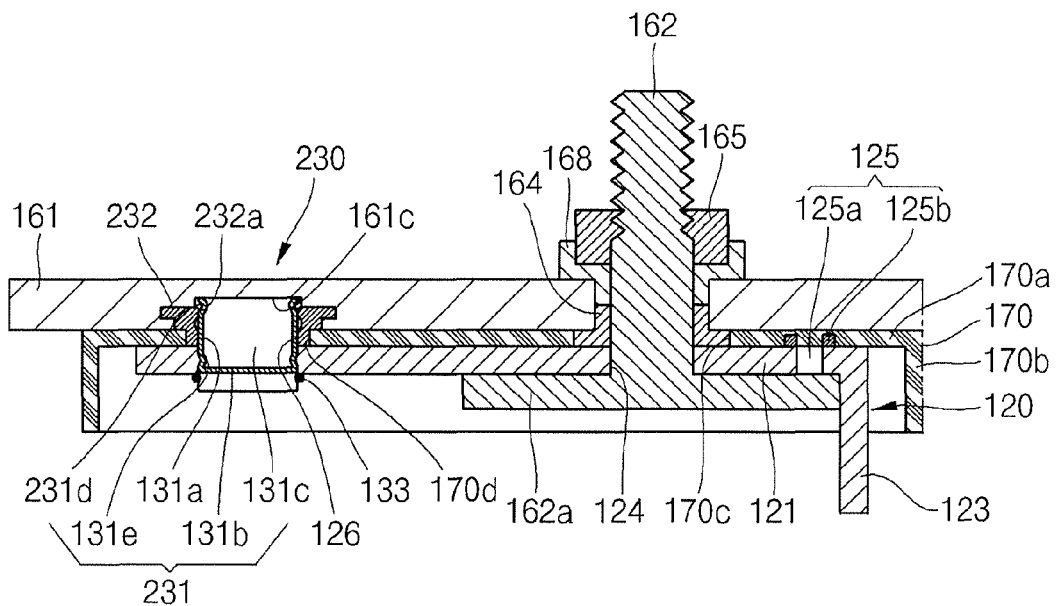
FIG. 7 is a cross-sectional view illustrating an operation in which a metal can of FIG. 6 contacts a cap plate.
Figure 8:
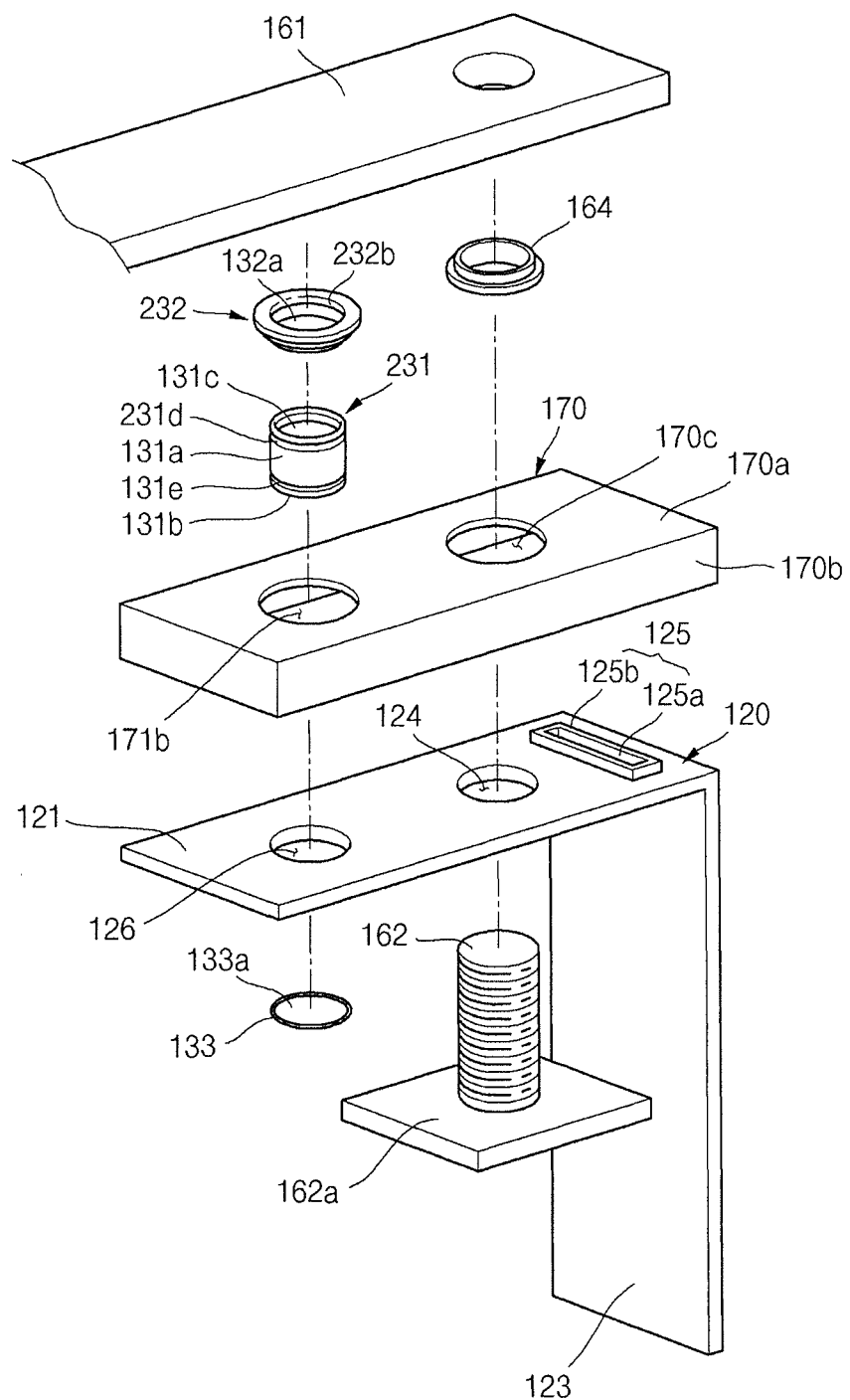
FIG. 8 is an exploded perspective view partially illustrating a structure shown in FIG. 6.

Referring to FIGS. 6 through 8, the secondary battery according to the embodiment of the present invention includes an electrode assembly 110, a first collecting plate 120, a short circuit member 230, a second collecting plate 140, a case 150, and a cap assembly 160.

The short circuit member 230 includes a metal can 231, a sealing gasket 232 and a holder 133, and is substantially the same as the short circuit member 130 of the previous embodiment. As shown in FIG. 6, the metal can 231 includes a concave portion 231d, instead of the convex portion 131d of the metal can 131. The concave portion 231d inwardly protrudes from the metal can 231 and has a curvature, like the convex portion 131d, thereby facilitating pushing of a protruding part 232b of the sealing gasket 232 to allow the metal can 231 to upwardly move when the internal pressure of the secondary battery 100 exceeds a predetermined pressure level, as shown in FIG. 7. In addition, the protruding part 232b of the sealing gasket 232 protrudes more inwardly to the opening 132a than the protruding part 132b of the sealing gasket 132 to increase the efficiency of sealing a space formed between the metal can 231 formed of the concave portion 231d and the cap plate 161. Here, an end of the concave portion 231d closely contacts the protruding part 232b of the sealing gasket 232.

Figure 9:
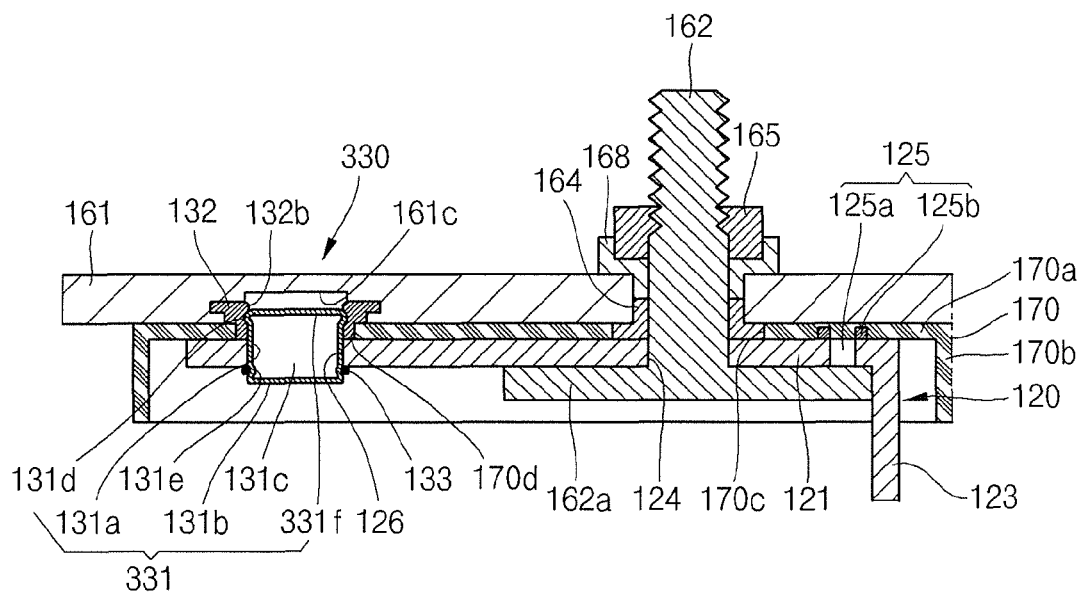
FIG. 9 is a cross-sectional view illustrating a portion corresponding to FIG. 3 in a secondary battery according to still another embodiment of the present invention.

Next, a secondary battery according to still another embodiment of the present invention will be described. FIG. 9 is a cross-sectional view illustrating a portion corresponding to FIG. 3 in a secondary battery according to still another embodiment of the present invention, FIG. 10 is a cross-sectional view illustrating an operation in which a metal can of FIG. 9 contacts a cap plate, and FIG. 11 is an exploded perspective view partially illustrating a structure shown in FIG. 9.

The secondary battery according to the embodiment of the present invention is substantially the same as the secondary battery 100 shown in FIG. 2, except for a short circuit member 330. Thus, repeated explanations will be omitted and the following description will focus on the short circuit member 330.

Figure 10:
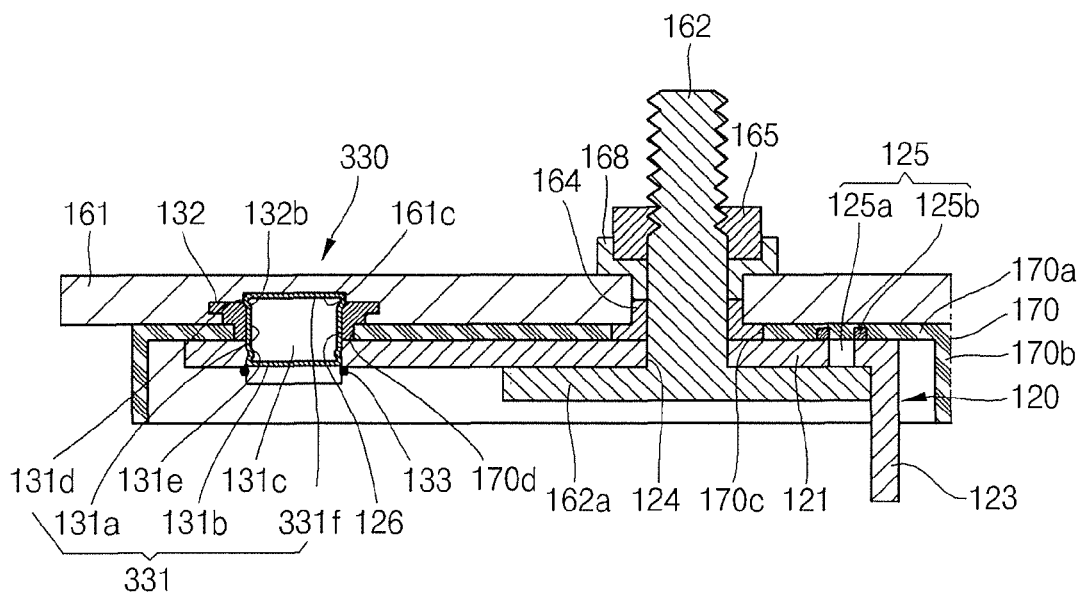
FIG. 10 is a cross-sectional view illustrating an operation in which a metal can of FIG. 9 contacts a cap plate.
Figure 11:
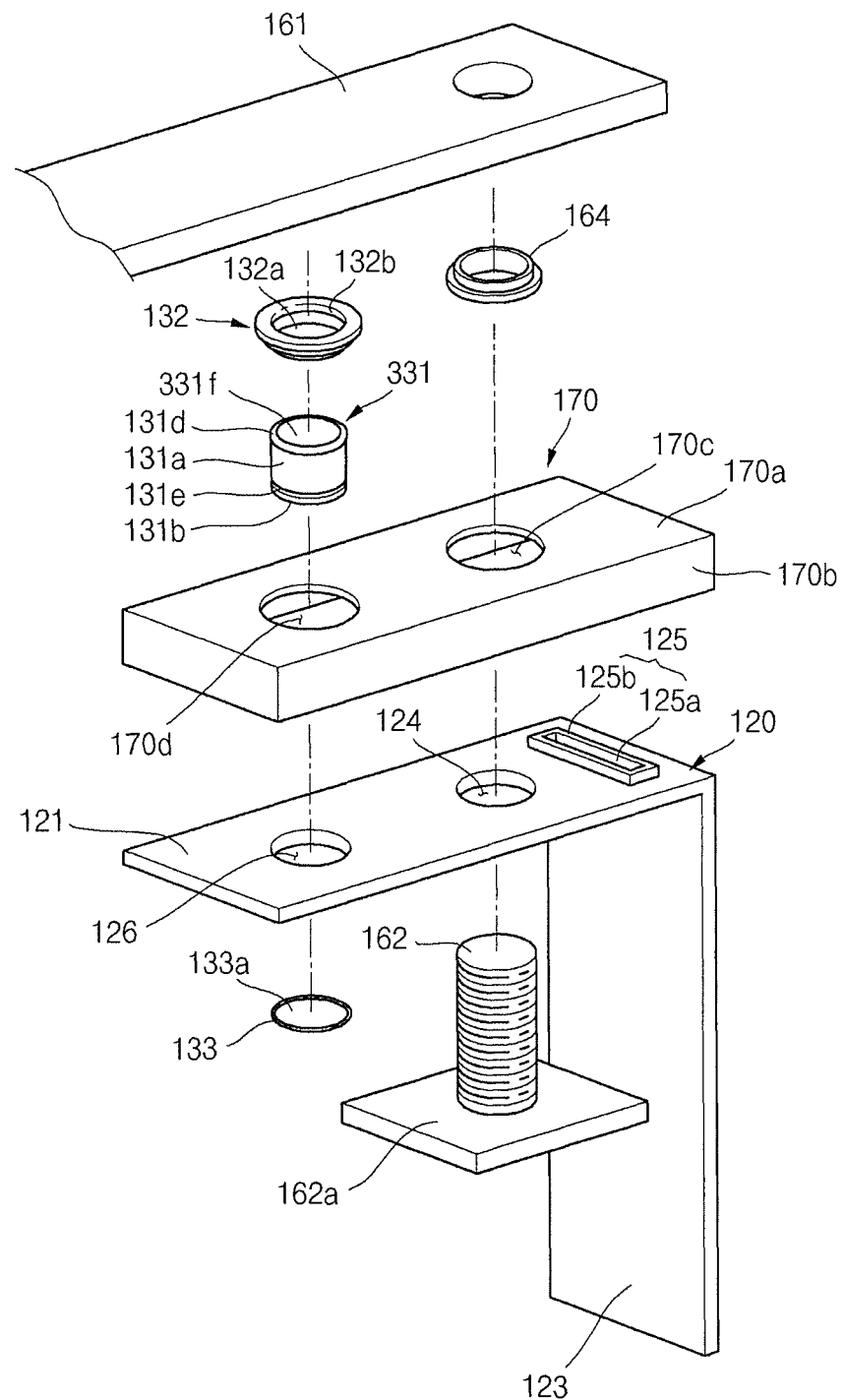
FIG. 11 is an exploded perspective view partially illustrating a structure shown in FIG. 9.

Referring to FIGS. 9 through 11, the secondary battery according to the embodiment of the present invention includes an electrode assembly 110, a first collecting plate 120, a short circuit member 330, a second collecting plate 140, a case 150, and a cap assembly 160.

The short circuit member 330 includes a metal can 331, a sealing gasket 132 and a holder 133, and is substantially the same as the short circuit member 130 of the previous embodiment. As shown in FIG. 9, the metal can 331 is formed on a convex portion 131d and further includes an upper surface 331f facing a lower surface 131b.

The upper surface 331f enlarges an contact area between the cap plate 161 and the metal cal 331 when the metal can 331 upwardly moves to contact the cap plate 161 when the internal pressure of the secondary battery 100 exceeds a predetermined pressure level, as shown in FIG. 10, thereby facilitating induction of short circuit. Here, when the internal pressure of the secondary battery 100 exceeds the predetermined pressure level, the metal can 331 moves upwardly due to a pressure difference between a region between an upper portion of the metal can 331 and a lower portion of the cap plate 161 and another region between an outside portion of the metal can 331 and an inside portion of the case 150.

While this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims.

What is claimed is:

1. A secondary battery comprising:
   an electrode assembly;
   a collecting plate directly coupled to the electrode assembly and having a short circuit hole;
   a case accommodating the electrode assembly and the collecting plate and having an opening;
   a cap assembly comprising a cap plate sealing the opening of the case; and
   a short circuit member comprising a metal can, wherein the metal can is in the short circuit hole and directly contacts the collecting plate and wherein the metal can is configured to move between a first position in which it is spaced from the cap plate and a second position in which it directly contacts the cap plate.

2. The secondary battery of claim 1, wherein the metal can is spaced from the cap plate.

3. The secondary battery of claim 1, wherein the metal can and the cap plate comprise a conductive material and have different polarities.

4. The secondary battery of claim 1, wherein the metal can contacts the cap plate when an internal pressure of the secondary battery exceeds a predetermined pressure level.

5. The secondary battery of claim 1, wherein the short circuit member further comprises:
   a sealing gasket located between the cap plate and the metal can, the sealing gasket including an opening aligned with the metal can and a protruding part protruding from an upper inside portion of the opening; and a holder located at an edge portion of the short circuit hole and adjacent to the collecting plate.

6. The secondary battery of claim 5, wherein the metal can is a hollow container having a lateral surface, a lower surface connected to the lateral surface to define a cavity with the lateral surface, a convex portion formed at an upper end of the lateral surface, and a recess portion formed at a lower portion of the lateral surface.

7. The secondary battery of claim 6, wherein the convex portion outwardly protrudes from the metal can and contacts the protruding part of the sealing gasket.

8. The secondary battery of claim 6, wherein the holder has an opening aligned with the short circuit hole and wherein the holder is in the recess portion.

9. The secondary battery of claim 5, wherein the metal can is a hollow container having a lateral surface, a lower surface connected to the lateral surface to define a cavity with the lateral surface, a concave portion formed at an upper end of the lateral surface, and a recess portion formed at a lower portion of the lateral surface.

10. The secondary battery of claim 9, wherein the concave portion inwardly protrudes from the metal can and contacts the protruding part of the sealing gasket.

11. The secondary battery of claim 6, wherein the metal can further includes an upper surface on the convex portion, and wherein the convex portion contacts the protruding part of the sealing gasket.

12. The secondary battery of claim 5, wherein the sealing gasket comprises an insulating material.

13. The secondary battery of claim 5, wherein the holder comprises a plastic material.

14. The secondary battery of claim 1, wherein the metal can comprises phosphor bronze or beryllium copper.

15. The secondary battery of claim 1, wherein the collecting plate comprises:
a connecting portion located between the electrode assembly and the cap assembly and having the short circuit hole extending therethrough; and
an extending portion bent and extending from the connecting portion and electrically connected to the electrode assembly.

16. The secondary battery of claim 15, wherein the collecting plate further has a fuse hole on the connecting portion adjacent to the extending portion.

17. The secondary battery of claim 1, wherein the cap plate further comprises a short circuit groove facing the metal can.

18. The secondary battery of claim 1, further comprising a lower insulation member positioned between the collecting plate and the cap plate and covering the collecting plate, wherein the lower insulation member includes an exposing hole aligned with the metal can.

19. The secondary battery of claim 1, wherein the metal can faces the cap plate.

* * * * *